(12) United States Patent (10) Patent No.: US 12,423,258 B2
Roehrle et al. (45) Date of Patent: Sep. 23, 2025

(54) APPARATUS FOR INTERPROCESSOR COMMUNICATION, CONTROL DEVICE HAVING THE APPARATUS AND VEHICLE HAVING THE CONTROL DEVICE, METHOD FOR OPERATING THE APPARATUS

(71) Applicant: Robert Bosch GmbH, Stuttgart (DE)

(72) Inventors: Andreas Roehrle, Moegglingen (DE); Elias Froehlich, Aalen (DE); Pushpanathan Pradeep, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 18/453,171

(22) Filed: Aug. 21, 2023

(65) Prior Publication Data
US 2024/0078204 A1   Mar. 7, 2024

(30) Foreign Application Priority Data
Sep. 6, 2022   (DE) .................. 10 2022 209 229.5

(51) Int. Cl.
*G06F 13/40* (2006.01)
*B60R 16/023* (2006.01)
*B62D 5/04* (2006.01)

(52) U.S. Cl.
CPC ...... *G06F 13/4027* (2013.01); *B60R 16/0231* (2013.01); *B62D 5/046* (2013.01)

(58) Field of Classification Search
CPC .............. G06F 13/4027; G06F 15/163; B60R 16/0231; B62D 5/046; B62D 5/003; B62D 5/0481
See application file for complete search history.

(56) References Cited

U.S. PATENT DOCUMENTS

| | | | |
|---|---|---|---|
| 6,434,712 B1* | 8/2002 | Urban .................. | G06F 11/181 714/10 |
| 2014/0019662 A1* | 1/2014 | Coffey ................ | G06F 13/4027 710/306 |
| 2017/0282383 A1* | 10/2017 | Blakely ................. | B25J 9/1694 |
| 2018/0312279 A1* | 11/2018 | Boyle ...................... | G05D 7/03 |
| 2020/0052685 A1* | 2/2020 | Tzivanopoulos ........................... | H03K 17/04123 |
| 2021/0286061 A1* | 9/2021 | Charlot ................. | G01S 7/6245 |

* cited by examiner

*Primary Examiner* — Lindsay M Low
*Assistant Examiner* — Charles J Brauch
(74) *Attorney, Agent, or Firm* — Maginot, Moore & Beck LLP

(57) ABSTRACT

An apparatus for interprocessor communication includes a coupling element, a first transducer, and a second transducer. The coupling element includes a first interface to a first microprocessor and a second interface to a second microprocessor. The first interface and the second interface are connected together in a galvanically-isolated manner for communication purposes. The first transducer includes a third interface to the first microprocessor and a fourth interface to the second transducer. The second transducer includes a fifth interface to the second microprocessor and a sixth interface to the first transducer.

10 Claims, 2 Drawing Sheets

APPARATUS FOR INTERPROCESSOR COMMUNICATION, CONTROL DEVICE HAVING THE APPARATUS AND VEHICLE HAVING THE CONTROL DEVICE, METHOD FOR OPERATING THE APPARATUS

This application claims priority under 35 U.S.C. § 119 to patent application no. DE 10 2022 209 229.5, filed on Sep. 6, 2022 in Germany, the disclosure of which is incorporated herein by reference in its entirety.

The disclosure relates to an apparatus for interprocessor communication, a control device having the apparatus, and a vehicle having the control device, as well as a method for operating the apparatus.

BACKGROUND

Reliable interprocessor communication is particularly desirable in control devices having two redundant microprocessors, and in particular for an electronic steering system with ASIL-C/D classification.

SUMMARY

An apparatus for interprocessor communication, particularly in a vehicle, comprises a coupling element, the coupling element comprising an interface to a first microprocessor and an interface to a second microprocessor, the interfaces in the coupling element being connected together in a galvanically isolated manner for communication purposes, in particular in a capacitively or inductively isolated manner, the apparatus comprising a first transducer and a second transducer, the first transducer including an interface to the first microprocessor and an interface to the second transducer, the second transducer including an interface to the second microprocessor and an interface to the first transducer. Reliable communication between the microprocessors is enabled as a result.

Preferably, it is provided that the interface of the first transducer to the first microprocessor comprises a pin for transmitting a wake-up signal to the first microprocessor and/or that the interface of the second transducer to the second microprocessor comprises a pin for transmitting a wake-up signal to the second microprocessor. A reliable system start without any synchronization errors is enabled as a result.

Preferably, it is provided that that the interface of the first transducer to the first microprocessor comprises a pin for transmitting an interprocessor communication signal to the first microprocessor and/or for receiving an interprocessor communication signal from the first microprocessor and/or that the interface of the second transducer to the second microprocessor comprises a pin for transmitting an interprocessor communication signal to the second microprocessor and/or for receiving an interprocessor communication signal from the second microprocessor.

Preferably, it is provided that the apparatus comprises a common ground connection for the first microprocessor and the first transducer, and/or that the apparatus comprises a common ground connection for the second microprocessor and the second transducer. Impairment of interprocessor communication due to a shift in a ground potential is thereby avoided.

It is preferably provided that the apparatus comprises a common supply voltage terminal for the first microprocessor and the first transducer and the interface of the coupling element to the first microprocessor and/or that the apparatus comprises a common supply voltage terminal for the second microprocessor and the second transducer and the interface of the coupling element to the second microprocessor. For example, in a vehicle with two batteries, one of the batteries is connected to one of the supply voltage terminals and the other is connected to the other supply voltage terminal. Two subsystems with independent power supplies are provided as a result.

It is preferably provided that the apparatus comprises a common power supply for the first microprocessor and the first transducer and the interface of the coupling element to the first microprocessor, and/or that the apparatus comprises a common power supply for the second microprocessor and the second transducer and the interface of the coupling element to the second microprocessor. Redundancy is enabled as a result.

Preferably, it is provided that the power supply for the first microprocessor and the first transducer is independent of the power supply for the second microprocessor and the second transducer and/or that the power supply for the second microprocessor and the second transducer is independent of the power supply for the first microprocessor and the first transducer. At least one side of the control device is designed in a redundant manner as a result.

The apparatus is preferably designed to provide a connection of ground connections for the supply voltage terminals and/or for the power supplies to enable communication via the first transducer and the second transducer, the apparatus being designed to communicate in a galvanically isolated manner via the interfaces in the coupling element in an error event in which the connection to the ground connections is lost. The galvanically isolated communication remains intact.

Preferably, the interface to the first transducer and the interface to the second transducer are designed for half-duplex communication. Fast interprocessor communication is enabled as a result.

The apparatus is preferably designed for redundant communication via the interfaces in the coupling element on one hand and via the first transducer and the second transducer on the other. Communication in case of a one-time error is maintained as a result.

A control device comprising the device and the first microprocessor and the second microprocessor has advantages corresponding to those of the apparatus.

A vehicle comprising the control device has advantages corresponding to those of the apparatus.

The vehicle preferably comprises an actuator, in particular for a steering system, in which case the control device is designed to drive the actuator using the first microprocessor and/or the second microprocessor. Redundant actuation is reliably possible as a result.

A method for operating the apparatus provides a connection of ground connections for the supply voltage terminals and/or for the power supplies to enable communication via the first transducer and the second transducer, in which case communication occurs in a galvanically isolated manner via the interfaces in the coupling element in an error event in which the connection to the ground connections is lost. Robust communications in case of simple errors are maintained as a result.

BRIEF DESCRIPTION OF THE DRAWINGS

Further advantageous embodiments can be gathered from the following description and the drawings. The drawings show.

DETAILED DESCRIPTION

Figure 1:
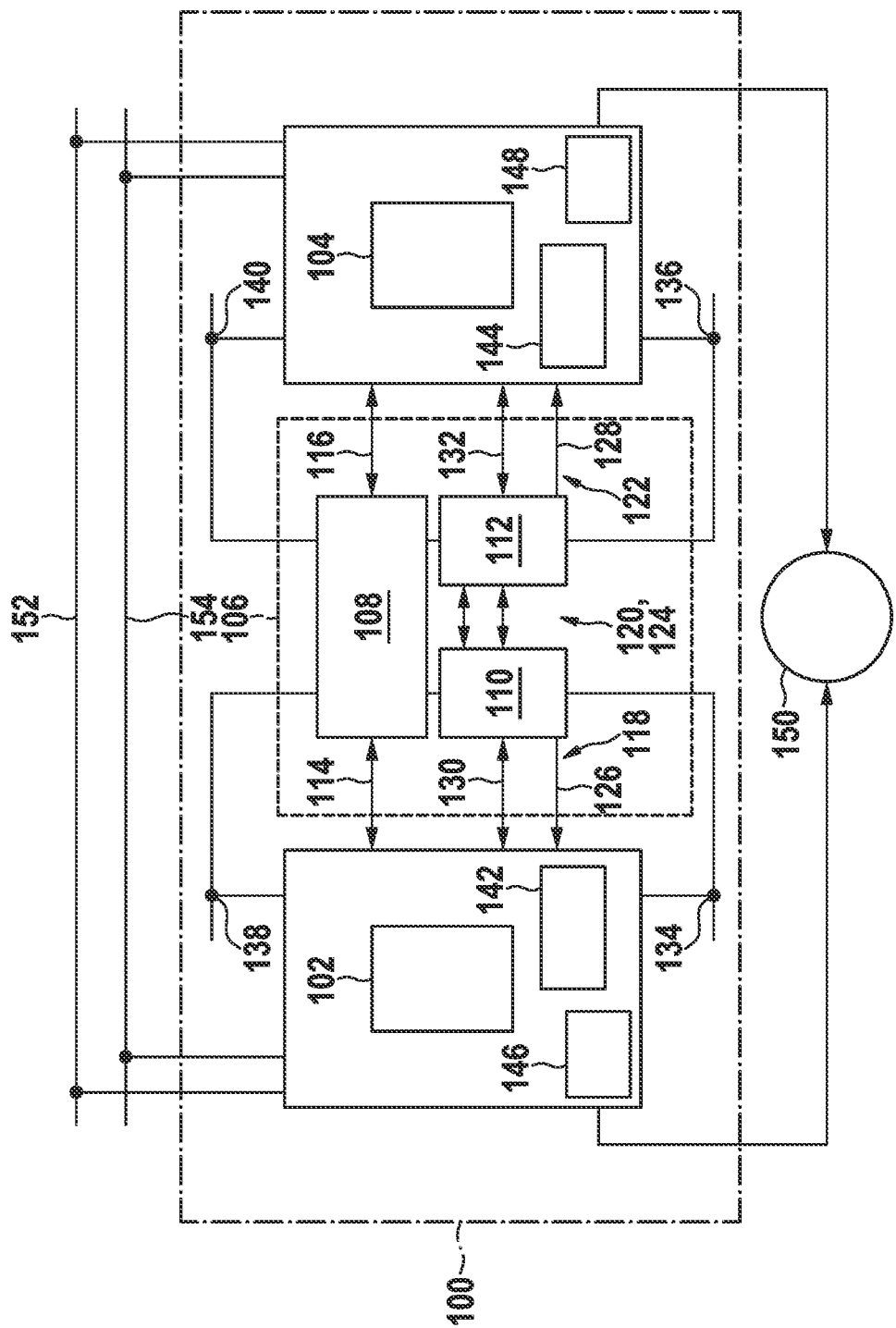
FIG. 1 a schematic illustration of a control device having an apparatus for interprocessor communication, FIG. 2 a schematic illustration of the vehicle having the control device, and FIG. 3 steps in a method for operating the apparatus.

FIG. 1 depicts a schematic illustration of a control device 100.

The control device 100 comprises a first microprocessor 102 and a second microprocessor 104.

The control device 100 comprises an apparatus 106 for interprocessor communication. In particular, interprocessor communication means communication between the first microprocessor 102 and the second microprocessor 104. Interprocessor communication is used to synchronize the redundant microprocessors, in particular in order to be able to reliably operate the control device in an error event in which one of the microprocessors is no longer usable.

The apparatus 106 comprises a coupling element 108. The apparatus 106 comprises a first transducer 110 and a second transducer 112.

In particular, the term transducer designates a transducer for differential data transmission. The transducer is designed to transmit differential signals on one side and receive differential signals on the other side. In the example, the transducer comprises corresponding digital-to-analog transducers and analog-to-digital transducers.

The coupling element 108 comprises an interface 114 to the first microprocessor 102 and an interface 116 to the second microprocessor 104. The interfaces in the coupling element 108 are connected with one another in a galvanically isolated manner for communication purposes. The galvanic separation is achieved, e.g., capacitively or inductively. In the example, the communication includes interprocessor communication between the microprocessors.

The first transducer 110 comprises an interface 118 to the first microprocessor 102 and an interface 120 to the second transducer 112.

The second transducer 112 comprises an interface 122 to the second microprocessor 104 and an interface 124 to the first transducer 110. In one example, the interface 124 to the first transducer 110 and the interface 120 to the second transducer 112 are designed for half duplex communication.

In one example, the interface 118 of the first transducer 110 to the first microprocessor 102 comprises a pin 126 for transmitting a wake-up signal to the first microprocessor 102.

In one example, the interface 122 of the second transducer 112 to the second microprocessor 104 comprises a pin 128 for transmitting a wake-up signal to the second microprocessor 104.

In one example, the interface 118 of the first transducer 110 to the first microprocessor 102 comprises a pin 130 for transmitting an interprocessor communication signal to the first microprocessor 102 and/or for receiving an interprocessor communication signal from the first microprocessor 102. Full duplex communication is provided between the transducers and the microprocessors in the example.

In one example, the interface 122 of the second transducer 112 to the second microprocessor 104 comprises a pin 132 for transmitting an interprocessor communication signal to the second microprocessor 104 and/or for receiving an interprocessor communication signal from the second microprocessor 104.

In one example, the apparatus 106 comprises a common ground connection 134 for the first microprocessor 102 and the first transducer 110 and the interface 114 of the coupling member 108 to the first microprocessor 102.

In one example, the apparatus 106 comprises a common ground connection 136 for the second microprocessor 104 and the second transducer 112 and the interface 116 of the coupling member 108 to the second microprocessor 104.

In one example, the apparatus 106 comprises a common supply voltage terminal 138 for the first microprocessor 102 and the first transducer 110 and the interface 114 of the coupling member 108 to the first microprocessor 102.

In a second example, the apparatus 106 comprises a common supply voltage terminal 140 for the second microprocessor 104 and the second transducer 112 and the interface 116 of the coupling element 108 to the second microprocessor 104

In one example, the apparatus 106 comprises a common power supply 142 for the first microprocessor 102 and the first transducer 110 and the interface 114 of the coupling member 108 to the first microprocessor 102.

In one example, the apparatus 106 comprises a common power supply 144 for the second microprocessor 104 and the second transducer 112 and the interface 116 of the coupling member 108 to the second microprocessor 104.

In one example, the power supply 142 for the first microprocessor 102 and the first transducer 110 and the interface 114 of the coupling element 108 to the first microprocessor 102 is independent of the power supply 144 for the second microprocessor 104 and the second transducer 112 and the interface 116 of the coupling element 108 to the second microprocessor 104.

In one example, the power supply 144 for the second microprocessor 104 and the second transducer 112 and the interface 116 of the coupling element 108 to the second microprocessor 104 is independent of the power supply 142 for the first microprocessor 102 and the first transducer 110 and the interface 114 of the coupling element 108 to the first microprocessor 102.

It can be provided that a common ground connection for the supply voltage terminals is provided for communication via the transducers.

It can be provided that a common ground connection for the power supplies is provided for communication via the transducers.

The control device 100 comprises a first output stage 146 and a second output stage 148. The first microprocessor 102 is designed to drive the first output stage 146. The second microprocessor 104 is designed to drive the second output stage 148.

In the example, the first output stage 146 is powered by the power supply 142 for the first microprocessor 102. In the example, the second output stage 148 is powered by the power supply 144 for the second microprocessor 104.

In one example, the control device 100 is designed to drive an actuator 150 using the first output stage 146 or the second output stage 148. The actuator 150 is, e.g., a 6-phase motor. It can be provided that the control device 100 is designed to drive the actuator 150 using the first output stage 146 and the second output stage 148. Each of the output stages drives, e.g., three of the six phases. The control device 100 is designed to drive the motor using the first microprocessor 102 or the second microprocessor 104. This can be done independently or concurrently.

In the example, the control device 100 is connected to a communication bus. In the example, the control device comprises one connection to the communication bus per microprocessor. In the example, one connection to a first signal line 152 and one connection to a second signal line 154 of the communication bus is shown per microprocessor. The communication bus is, e.g., designed according to CAN, FlexRay, or RS584 requirements.

Figure 2:
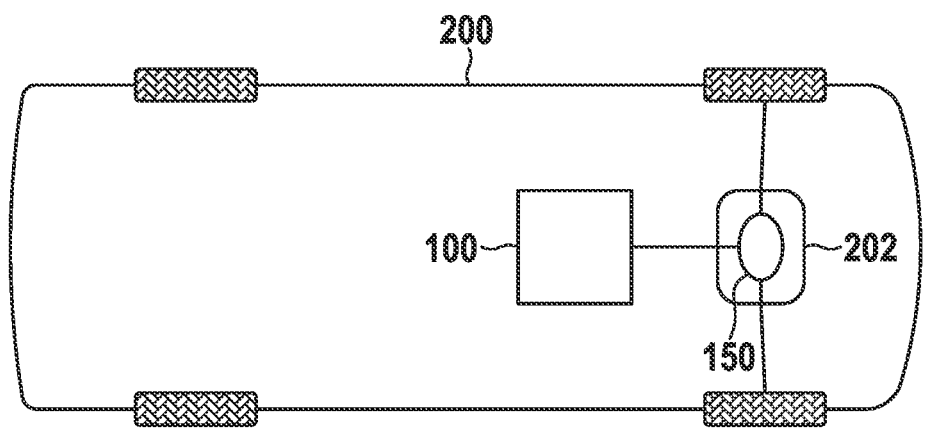

A vehicle 200 is shown schematically in FIG. 2. The vehicle 200 comprises the control device 100. The vehicle 200 comprises the output stage 150, in particular the motor. The motor in the example is a motor for a steering system 202 of the vehicle 200.

In one example, the interprocessor communication is performed via the galvanically isolated communication, and in one example it is performed via the transducers. It can be provided that the communication is performed redundantly via galvanically isolated communication and via the transducers. Doing so has the advantage that the communication remains uninterrupted if one of the two, i.e., either the coupling element or the transducer, fails.

It can be provided that, for communication via the transducers, the ground connections are connected, i.e., a common ground is provided for the supply voltage terminals and/or for the power supplies, whereby, in an event of an error in which the ground connections are disconnected, communication takes place in a galvanically isolated manner via the interfaces 114 and 116 in the coupling element 108. Communication between both microcontrollers then continues to be possible via the coupling element 108 by way of galvanic isolation.

In one example, a robustness of communication against interference signals is achieved by using transducers featuring differential signal transmission.

Figure 3:
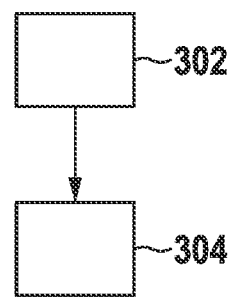

One method of operating the apparatus 106 is shown in FIG. 3. The method provides, e.g., that in a step 302 for communication via the first transducer 110 and the second transducer 112, a connection to the ground connections is provided for the supply voltage terminals 138, 140 and/or for the power supplies 142, 144, whereby, in step 304, in a case of error in which the connection to the ground connections is lost, communication takes place in a galvanically isolated manner via the interfaces 114, 116 in the coupling element 108.

What is claimed is:

1. An apparatus for interprocessor communication, comprising:
   a coupling element comprising a first interface to a first microprocessor and a second interface to a second microprocessor, the first interface and the second interface connected together in a galvanically-isolated manner for communication purposes;
   a first transducer operably connected to the coupling element and including a first digital-to-analog converter and a first analog-to-digital converter;
   a second transducer operably connected to the coupling element and including a second digital-to-analog converter and a second analog-to-digital converter;
   a first common ground connection for the first microprocessor, the first transducer, and the first interface of the coupling element; and
   a second common ground connection for the second microprocessor, the second transducer, and the second interface of the coupling element,
   wherein the first transducer comprises a third interface to the first microprocessor and a fourth interface to the second transducer, and
   wherein the second transducer comprises a fifth interface to the second microprocessor and a sixth interface to the first transducer.

2. The apparatus according to claim 1, wherein:
   the third interface of the first transducer comprises a first pin configured to transmit a first wake-up signal to the first microprocessor, and/or
   the fifth interface of the second transducer comprises a second pin configured to transmit a second wake-up signal to the second microprocessor.

3. The apparatus according to claim 1, wherein:
   the third interface of the first transducer comprises a first pin configured to transmit a first interprocessor communication signal to the first microprocessor, and/or configured to receive the first interprocessor communication signal from the first microprocessor, and/or
   the fifth interface of the second transducer comprises a second pin configured to transmit a second interprocessor communication signal to the second microprocessor, and/or configured to receive the second interprocessor communication signal from the second microprocessor.

4. An apparatus for interprocessor communication, comprising:
   a coupling element comprising a first interface to a first microprocessor and a second interface to a second microprocessor, the first interface and the second interface connected together in a galvanically-isolated manner for communication purposes;
   a first transducer operably connected to the coupling element and including a first digital-to-analog converter and a first analog-to-digital converter;
   a second transducer operably connected to the coupling element and including a second digital-to-analog converter and a second analog-to-digital converter;
   a first common supply voltage terminal for the first microprocessor, the first transducer, and the first interface of the coupling element;
   a second common supply voltage terminal for the second microprocessor, the second transducer, and the second interface of the coupling element;
   a first common power supply for the first microprocessor, the first transducer, and the first interface of the coupling element; and
   a second common power supply for the second microprocessor, the second transducer, and the second interface of the coupling element,
   wherein the first transducer comprises a third interface to the first microprocessor and a fourth interface to the second transducer, and
   wherein the second transducer comprises a fifth interface to the second microprocessor and a sixth interface to the first transducer.

5. The apparatus according to claim 4, wherein:
   the first common power supply is independent of the second common power supply, and/or
   the second common power supply is independent of the first common power supply.

6. The apparatus according to claim 4, wherein:
   the apparatus is configured to provide a connection of ground connections for supply voltage terminals and/or for the first and second common power supplies for communication via the first transducer and the second transducer, and
   the apparatus is configured to enable communication to take place in a galvanically-isolated manner via the first and second interfaces in the coupling element when the connection to the ground connections is lost.

7. The apparatus according to claim 1, wherein the sixth interface to the first transducer and the fourth interface to the second transducer are configured for half-duplex communication.

8. The apparatus according to claim 1, wherein the apparatus is configured for redundant communication based on the first and second interfaces in the coupling element and based on the first transducer and the second transducer.

9. A vehicle, comprising:
a control device having a first microprocessor, a second microprocessor, and an apparatus for interprocessor communication between the first microprocessor and the second microprocessor, the apparatus including (i) a coupling element comprising a first interface to the first microprocessor and a second interface to the second microprocessor, the first interface and the second interface connected together in a galvanically-isolated manner for communication purposes, (ii) a first transducer operably connected to the coupling element and including a first digital-to-analog converter and a first analog-to-digital converter, (iii) a second transducer operably connected to the coupling element and including a second digital-to-analog converter and a second analog-to-digital converter, (iv) a first common ground connection for the first microprocessor, the first transducer, and the first interface of the coupling element, and (v) a second common ground connection for the second microprocessor, the second transducer, and the second interface of the coupling element,
wherein the first transducer comprises a third interface to the first microprocessor and a fourth interface to the second transducer, and
wherein the second transducer comprises a fifth interface to the second microprocessor and a sixth interface to the first transducer.

10. The vehicle according to claim 9, further comprising:
an actuator for a steering system,
wherein the control device is configured to drive the actuator using the first microprocessor and/or the second microprocessor.

* * * * *